United States Patent [19]

Brandes

[11] 4,136,429

[45] Jan. 30, 1979

[54] DEVICE FOR INDEXING AN ARRAY OF SAMPLE CONTAINERS

[75] Inventor: Walter B. Brandes, Columbia, Md.

[73] Assignee: Baxter Travenol Laboratories, Inc., Deerfield, Ill.

[21] Appl. No.: 831,197

[22] Filed: Sep. 7, 1977

Related U.S. Application Data

[63] Continuation of Ser. No. 679,540, Apr. 23, 1976, abandoned.

[51] Int. Cl.[2] .............................................. B23P 19/02

[52] U.S. Cl. .......................................... 29/235; 40/324

[58] Field of Search .................... 29/235, 282; 40/324, 40/310, 20 A; 206/562, 557; 108/25, 28

[56] References Cited

U.S. PATENT DOCUMENTS

| | | | |
|---|---|---|---|
| 3,442,378 | 5/1969 | Wolfe | 40/324 |
| 3,478,457 | 11/1969 | Watkins | 40/324 |
| 3,618,836 | 11/1971 | Bushnell | 40/324 |

*Primary Examiner*—James L. Jones, Jr.
*Attorney, Agent, or Firm*—Henry W. Collins; Paul C. Flattery; George H. Gerstman

[57] ABSTRACT

A device having an indexed array of container holding stations, said device having a plurality of correspondingly indexed labels, one of which is associated with each station in the array, said indexed labels adapted automatically to grip a sample container as it is positioned in a selected station and said indexed stations and indexed labels further providing a verification system mitigating the possibility for transposition of sample containers in the array.

7 Claims, 9 Drawing Figures

DEVICE FOR INDEXING AN ARRAY OF SAMPLE CONTAINERS

This is a continuation of application Ser. No. 679,540, filed Apr. 23, 1976, now abandoned.

The present invention relates to a tray for holding an array of sample containers, said tray having a plurality of test indentification tags, one associated with each position in the array so that when a sample container is inserted into the tray an indicia bearing tag is automatically attached thereto. Corresponding indicia are associated with each position in the array so that in use it is practically impossible to transpose sample containers within said array.

Routine analysis of body fluids frequently provides highly useful information, leading for example to better diagnosis and treatment. Accidental correlation of the results of an analysis to the wrong patient, however, may be misleading and may, in some instances, be fatal. It is, therefore, desirable to have a means for accurately identifying each sample and preventing the transposition thereof.

In the past, sample containers have frequently been marked by writing thereon with a grease pencil or the like. Not only is this time consuming but it is also difficult to make these markings clearly. Moreover, in the process of loading and unloading marked containers, the writing often becomes smudged and illegible. Other systems for identifying sample containers, such as by sticking paper numbers on the containers or using prenumbered cups, have suffered similar shortcomings and are laborious, time-consuming or, in the case of prenumbered cups, expensive.

Up until now, there has been no simple, effective means for automatically attaching test identification tags to sample containers and for lessening the possibility for transposition of samples withdrawn for analysis. Accordingly, among the several objects of the present invention is to provide a simple, effective tray having cooperative test identification tags, use of which avoids the tedious, individual marking of sample containers or the use of prenumbered cups and minimizes the possibility for transposition of the samples on the tray. Another object is to provide an automatic means for ejecting the sample containers from the tray while leaving the test identification tags in place on the tray. Other objects and features will be in part apparent and in part pointed out hereinafter.

In the accompanying drawings, several embodiments of the invention are illustrated.

Figure 1:
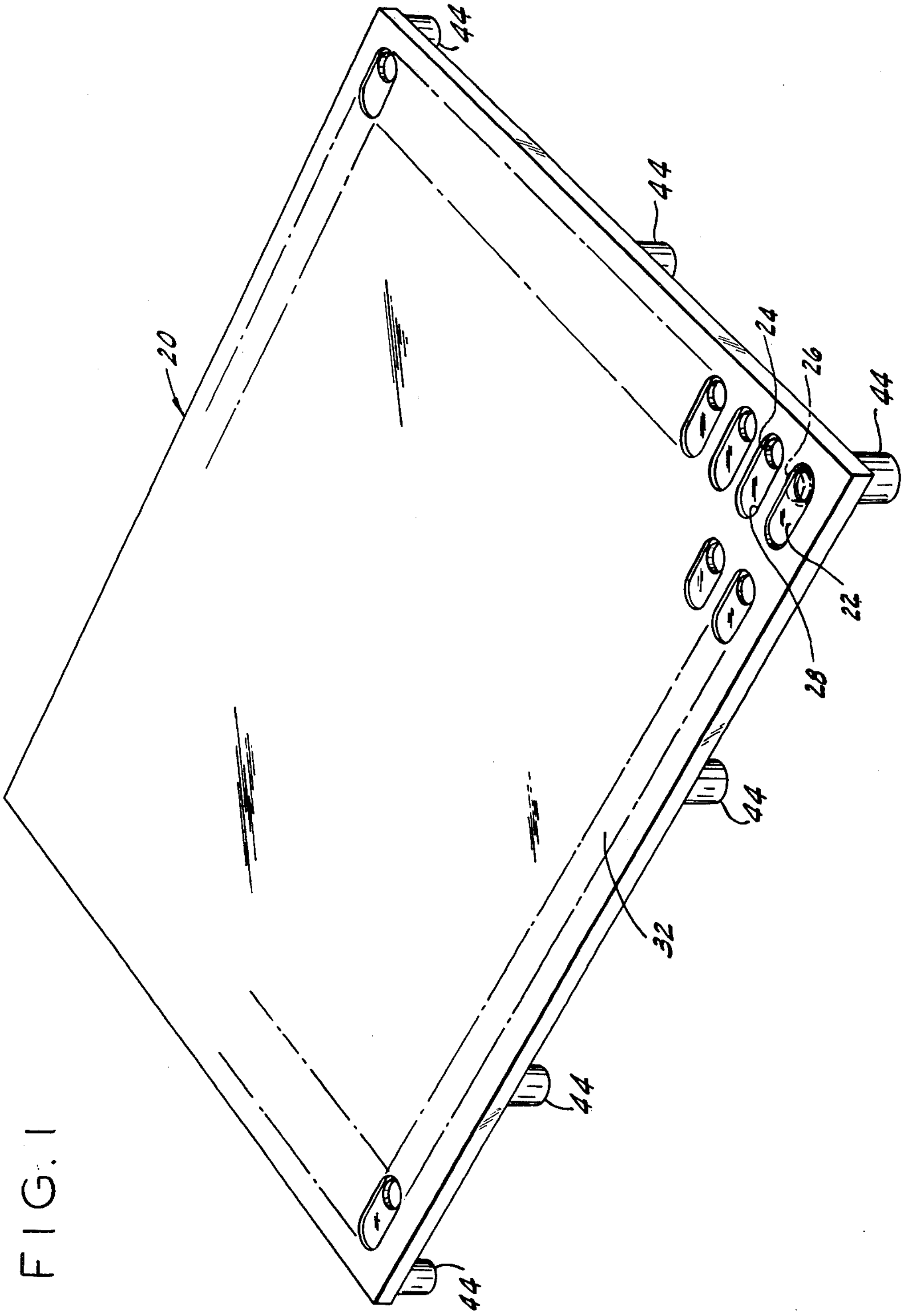
FIG. 1 is a perspective view of the tray embodying the invention for holding an array of sample containers, said tray having a plurality of test identification tags, one associated with each position in the array.
Figure 2:
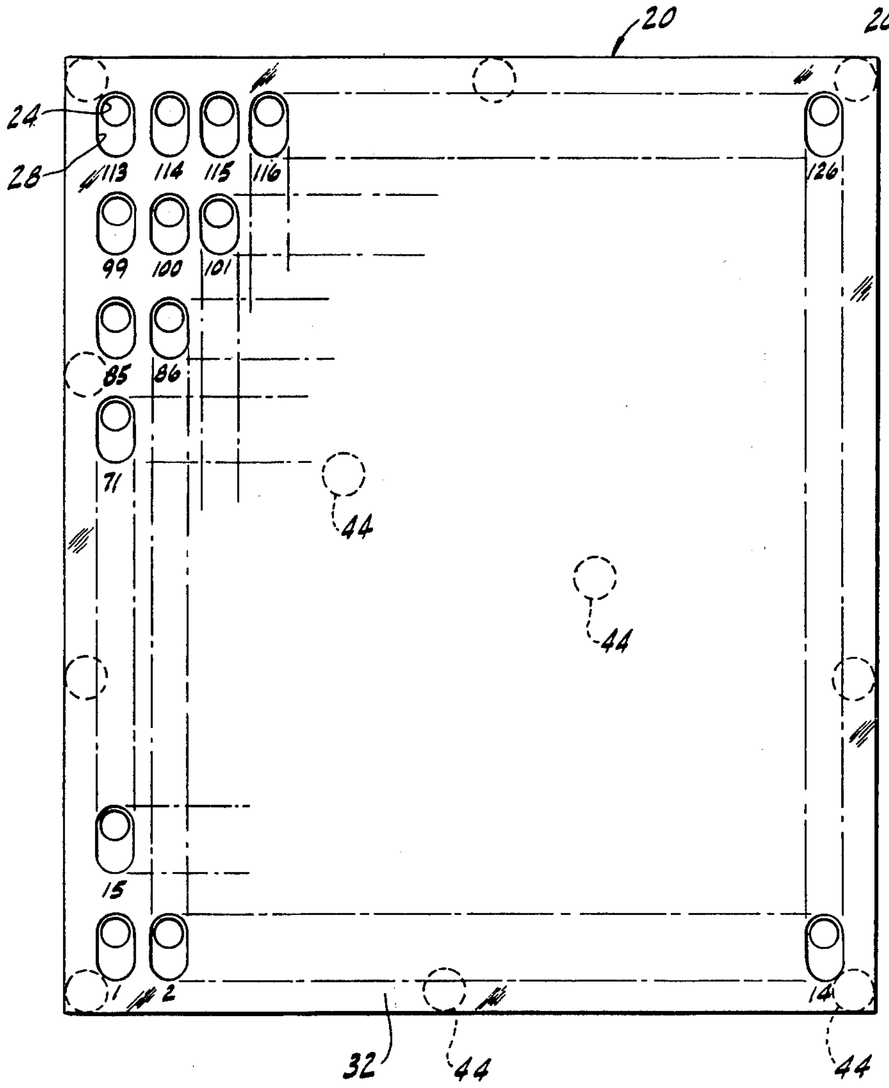
FIG. 2 is a plan view of the tray shown in FIG. 1.
Figure 3:
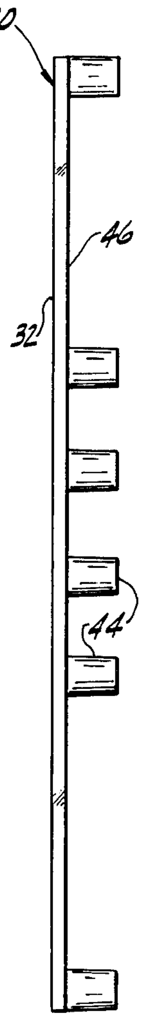
FIG. 3 is an elevational view of the tray along its longer side.
Figure 4:
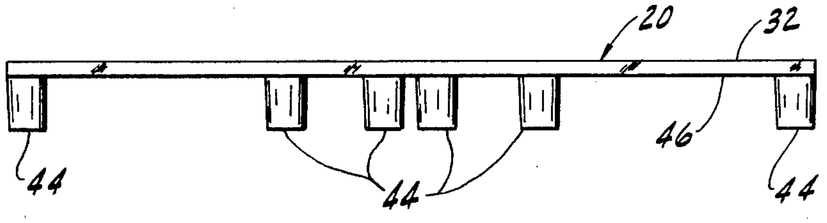
FIG. 4 is an elevational view of the tray along its shorter side.

Throughout the drawings corresponding reference numerals refer to corresponding parts and, as best seen in FIGS. 1 and 2, reference numeral 20 refers to a tray with identification tags 22 constructed in accordance with the present invention. It is desirable that tray 20 be relatively light weight but, at the same time, that it be rugged and durable to facilitate handling and resist ordinary cleaning and sterilizing agents.

Tray 20, as shown, is preferably a plate formed from high impact butadiene styrene and perforated with holes 24 arranged in rows, nine openings along its longer side and fourteen along its shorter, making 126 holes in all. Holes 24 are sized for receipt of sample containers 26 and are sufficiently spaced apart to facilitate easy insertion and removal of the sample containers as more particularly described below.

Figure 5:
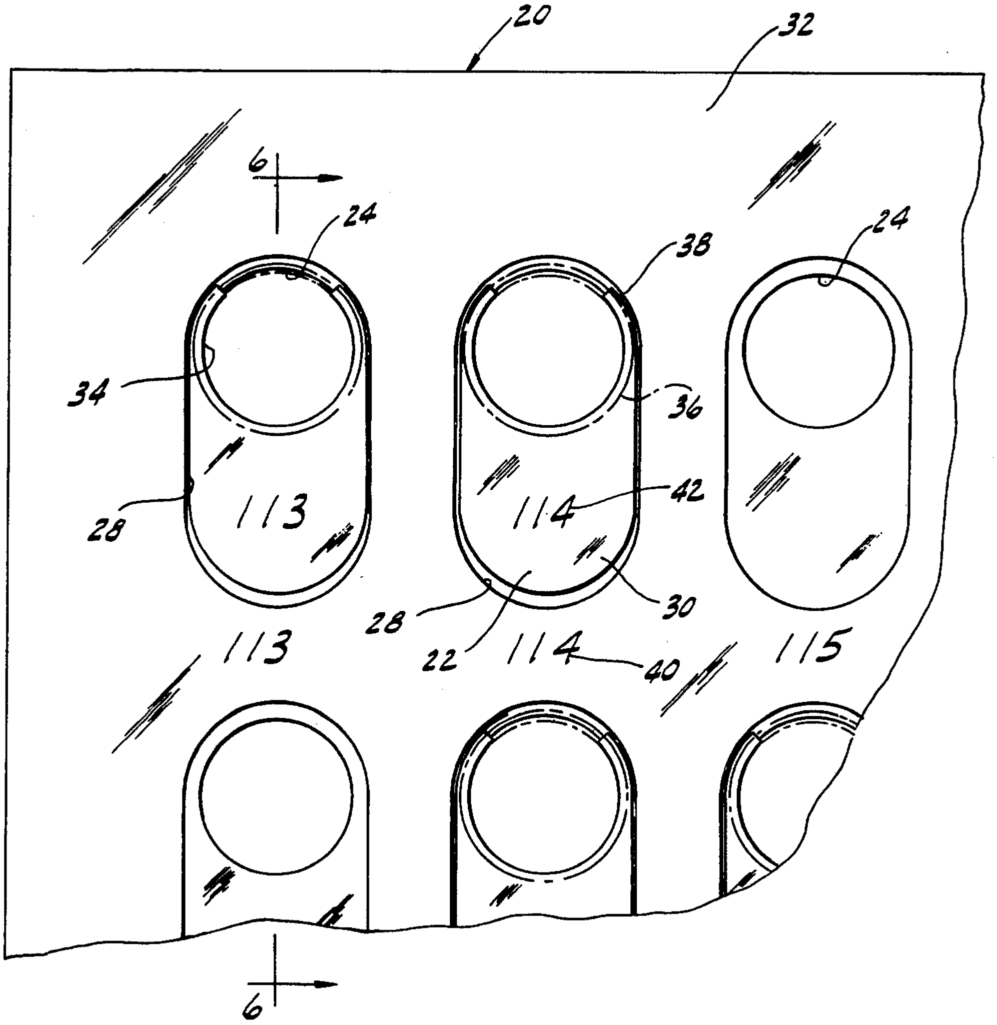
FIG. 5 is an enlarged fragmentary plan view of the left hand, top corner of the tray as viewed in FIG. 2.
Figure 6:
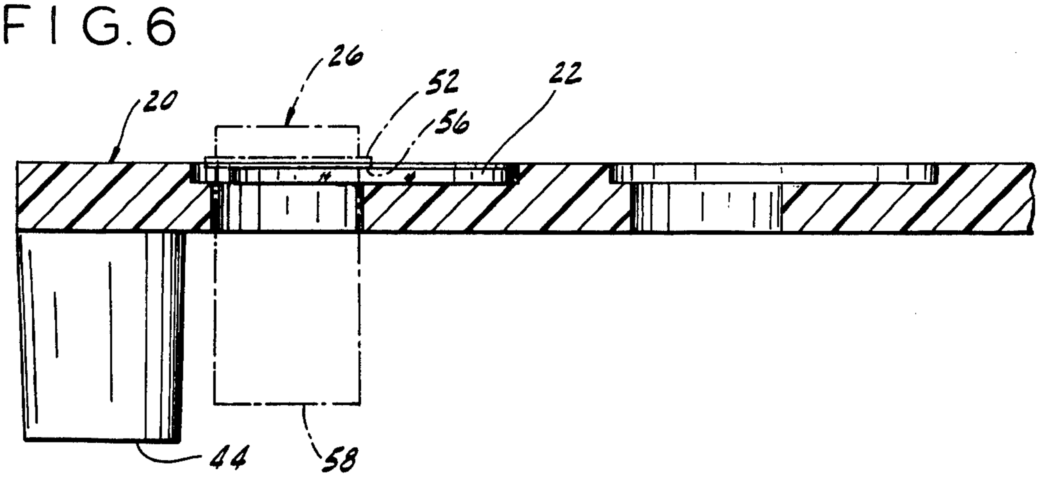
FIG. 6 is a cross section taken along line 6—6 in FIG. 5.

Coincident with each hole 24 is a recess 28 which, as best seen with reference to FIGS. 5 and 6, is cooperatively sized and shaped to receive one of identification tags 22. As shown, tags 22 are received in recesses 28 such that the upper surface 30 of tag 22 is in substantially the same plane as the upper surface 32 of tray 20.

Recesses 28 are shown as generally elliptical in shape, flattened along the long axis thereof and in alignment with the longer sides of tray 20. Their depth is preferably no more than one-half the thickness of tray 20 so that sufficient strength is left in tray 20 to prevent punching out the recess when a sample container is inserted in one of holes 24.

Each of tags 22 includes a slotted aperture 34 which, when tags 22 are inserted in recesses 28 as shown, is in coaxial alignment with underlying hole 24. Tags 22 are preferably flat and formed from any suitable resilient material such as high impact butadiene styrene or the like. Slotted aperture 34 forms a collar 36 which is dimensioned such that its distal ends 38 are sprung slightly laterally outwardly into gripping relationship when sample container 26 is pushed therethrough as more particularly described hereinafter.

Immediately adjacent each recess 28 is an identifying indicia 40 indicating the number of that station within the array of holes. Indicia 40 may be optically or magnetically encoded with machine readable symbols for use in automatic data processing systems or, as shown, may be encoded for visual or tactile interpretation by the operator. As best seen in FIG. 5, other indicia 42 corresponding to adjacent station identifying indicia 40 are encoded on the upper surface 30 of each tag 22.

A plurality of legs 44 depend from the lower surface 46 of tray 20. In the embodiment shown, there are twelve legs, ten of which are symmetrically spaced around the margin of tray 20 and two of which are positioned under the central portion to prevent it from sagging.

While the device thus far described is useful with any suitable sample container 26, its use will be readily understood by reference to but one such container. As shown, sample container 26 includes an elongated cylindrical housing 48, coaxially joined in sealed relationship at its upper end to the open end of an inner cup 50. Adjacent the upper end of housing 48 is an outwardly extending peripheral flange 52 forming an abutment shoulder described hereinafter.

In use, tray 20 is placed upon a supporting surface. Tags 22 are positioned in recesses 28 such that indicia 42 correspond with adjacent indicia 40. To this end, tags 22 initially having no indicia may be inserted in recesses 28 of a tray 20 similarly having no indicia. Indicia 40 and 42 may then be simultaneously printed on tags 22 and tray 20 resulting in the ordered arrangement described above and shown in the drawings. This arrangement may then be retained during shipment or until required for use by shrink wrapping the assembly thus preventing disarrangement of the tags. Alternatively, indicia 40 and 42 may be printed in separate operations and tags 22 then arranged in recesses 28 as above described.

With tray 20 setting upon the supporting surface and with slotted apertures 34 and indicia 42 in alignment with holes 24 and indicia 40, respectively, each sample container 26 is axially inserted downwardly through slotted apertures 34 into selected holes 24. As sample containers 26 are inserted through slotted apertures 34, each container is automatically grasped by the associated tag and marked thereby. More particularly, the distal ends 38 of collar 36 spring outwardly so that tag 22 collars sample container 26 below its upper extremity. Since tag 22 so sprung is slightly expanded, recesses 28 must be large enough to accommodate it in stressed condition.

The downward insertion of sample containers 26 is stopped by the surrounding surface or, as shown, by an abutment shoulder 56 formed by the underside of flange 52 resting on upper surface 30 of tag 22. For this purpose, as best seen in FIG. 6, slotted apertures 34 are radially smaller than flange 52 while holes 24 are radially larger than sample containers 26 to permit insertion therein without resistance. Also, to this end, legs 44 extend beyond bottom ends 58 of sample containers 26 so that the containers are spaced away from and do not contact the supporting surface.

The number of sample containers 26 which are needed are inserted in tray 20. If more than 126 are needed, additional trays (not shown) identical to tray 20 or with sequentially higher numbered tags and recesses may be used.

Figure 7:
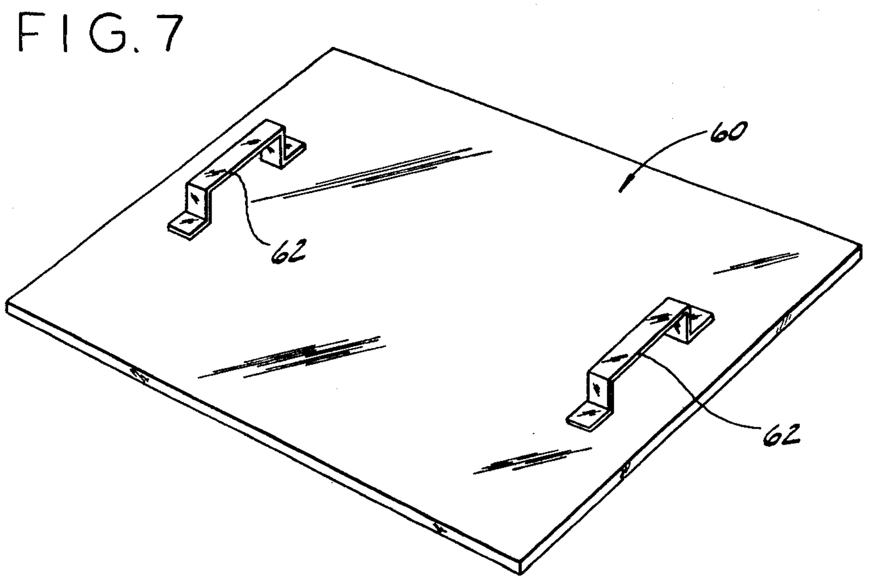
FIG. 7 is a perspective view of an evaporation cover for use with the tray.

Once the required number of sample containers 26 have been inserted in tray 20, they are ready to be filled with body fluids, biological matter or other materials to be analyzed. If the analyses are not to be performed immediately or if it is desired to reduce evaporative losses, cover 60 may be placed over the open ends of sample containers 26. As shown in FIG. 7, cover 60 is preferably transparent and has a pair of handles 62 providing an easy means for installing and removing the cover.

When a sample container 26 is withdrawn from tray 20 for analysis, cover 60 (if present) is removed and the container with its associated identification tag 22 lifted from the tray. At the end of the test, sample container 26 is returned to the same position on tray 20. This is accomplished by matching indicia 42 on tag 22 with indicia 40. So done, it is practically impossible to transpose sample containers on the tray and any error which does occur can immediately be seen and corrected.

If desired, tray 20 with its charge of sample containers 26 is stood in a temperature controlled bath. The bath is filled to the level of tray 20 and the temperature controlled fluid circulated in and around the sample containers. This is a desired feature, for example, when the samples are to be kept at body or some other preselected temperature.

At the end of all of the analyses, sample containers 26 are separated from tags 22 by holding the tags down while pulling the containers axially upwardly. The user may accomplish this by pressing down on the tag with one hand while pulling the container out with the other.

Figure 8:
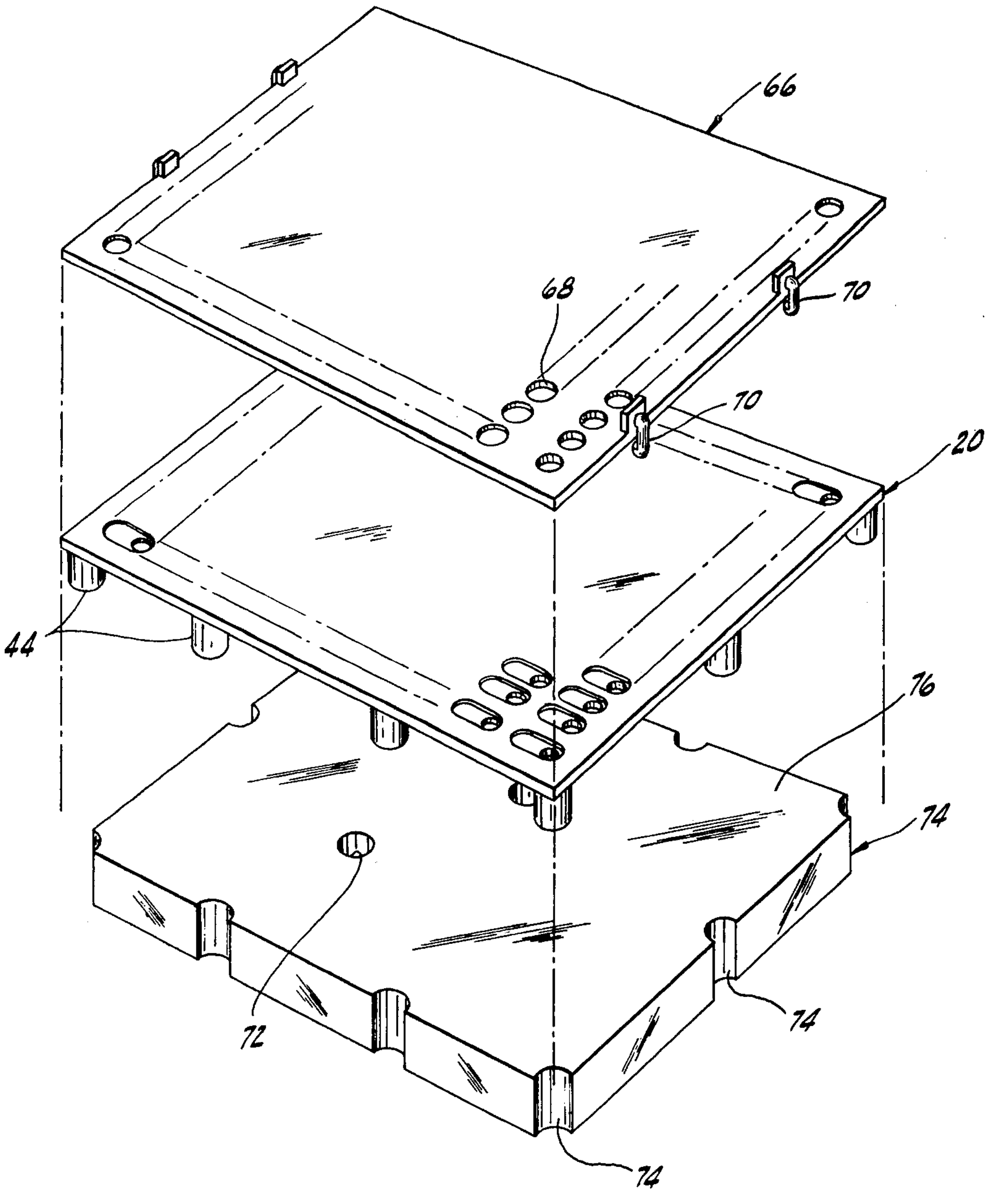
FIG. 8 is a perspective, exploded view of the tray, showing sample containers being unloaded therefrom by means of a knockout tray and an extraction base.

If the user prefers to extract all of the sample containers 26 at the same time, a device such as that shown in FIG. 8 is used wherein reference numeral 76 refers to an extraction base and numeral 66 to a knockout tray. Knockout tray 66, as shown in FIG. 8, is a plate with a plurality of bores 68, each of which is aligned for registry with holes 24 in tray 20. Bores 68 are large enough to pass sample containers 26 freely therethrough but small enough to exclude tags 22. Knockout tray 66 is further provided with depending snaps 70 for securing it to tray 20.

Extraction base 76 is dimensioned to be received under tray 20. It is provided with recesses 72 to accommodate legs 44 under the central portion of the tray and with grooves 74 to receive the legs around the margin.

In unloading tray 20, the operator places knockout tray 66 over tray 20, aligning bores 68 with holes 24. Thereafter, both tray 20 and knockout tray 66, which is held firmly thereto by snaps 70, is lowered relative to extraction base 76. Its descent being guided by legs 44 in recesses 72 and grooves 74 and being stopped when lower surface 46 of tray 20 comes to rest on upper surface of the extraction base 76.

Figure 9:
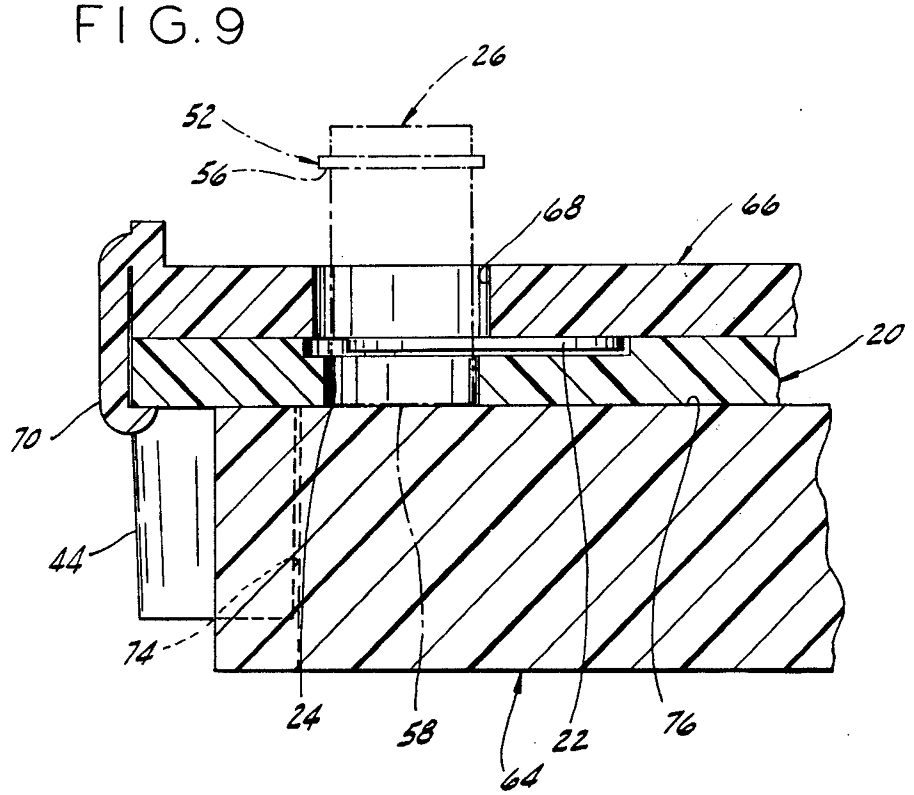
FIG. 9 is a cross section similar to FIG. 6 except showing a sample container being unloaded from the tray by means of the knockout tray and the extraction base.

As tray 20 is lowered onto extraction base 76, as best seen in FIG. 9, sample containers 26 are pushed out of holes 24, through slotted apertures 34 in tags 22 and into bores 68 in knockout tray 66. With the sample containers 26 in bores 68, the assembly is inverted as a unit and dumped. After dumping, knockout tray 66 is unsnapped from tray 20. Tray 20 is then ready for use again, each of tags 22 being in its proper recess 28.

In view of the above, it will be seen that the several objects of the invention are achieved and other advantageous results attained. More particularly, the present invention provides a device having an indexed array of container holding stations such as holes 24, said device having a plurality of correspondingly indexed labels such as tags 22, one of which is associated with each station in the array, said indexed labels providing for pre-labeling the sample containers before samples are disposed therein. Said device thereby providing a means for labeling the samples at the same time that empty containers are loaded on the tray in selected holding stations without requiring a separate labeling step, thereby minimizing the possibility for error in labeling. Said device further providing a means for attaching a label which is neither detachable from the sample container nor subject to damage or alteration under normal conditions.

The present invention further providing a verification system involving the comparison of the indexed labels such as tags with indicia 42 with the indexed stations such as tray with indicia 40, thereby collating the samples and mitigating the possibility for transposition of the sample containers within the array.

As various changes could be made in the above constructions without departing from the scope of the invention, it is intended that all matter contained in the above description or shown in the accompanying drawings shall be interpreted as illustrative and not in a limiting sense.

What is claimed is:

1. A device for holding a plurality of sample containers in an orderly arrangement, comprising, in combination:

a tray defining an array of indexed container holding stations, said container holding stations each comprising an aperture on said tray dimensioned to receive and support one of said sample containers;

each of said stations including a tag indexed to the station and adapted to automatically grip a sample container as it is positioned in the station, and to ordinarily remain with the sample container when it is removed from the station;

said tags each including an indicia-bearing label portion, and a collar portion adapted to grip one of said sample containers; and each of said container holding stations comprising means for supporting one of said tags with the collar portion thereof in alignment with the sample container receiving aperture of said station.

2. The device according to claim 1 wherein said means for supporting said tags comprise recesses in said tray.

3. A device for holding a plurality of sample containers in an orderly arrangement, comprising, in combination:

a tray defining an array of indexed container holding stations, said container holding stations each comprising an aperture on said tray dimensioned to receive and support one of said sample containers;

each of said stations including a tag indexed to the station and adapted to automatically grip a sample container as it is positioned in the station, and to ordinarily remain with the sample container when it is removed from the station;

said tags each including an indicia-bearing label portion, and a collar portion adapted to grip one of said sample containers; and each of said sample containers having an outwardly extending flange at the top end thereof, said flange being positioned to come into abutting engagement with the collar portion of the associated tag to limit insertion of the sample container into its associated aperture in said tray.

4. A device for holding a plurality of sample containers in an orderly arrangement, comprising, in combination:

a tray defining an array of indexed container holding stations, said container holding stations each comprising an aperture on said tray dimensioned to receive and support one of said sample containers;

each of said stations including a tag indexed to the station and adapted to automatically grip a sample container as it is positioned in the station, and to ordinarily remain with the sample container when it is removed from the station;

said tags each including an indicia-bearing label portion, and a collar portion adapted to grip one of said sample containers; and a removal plate having a plurality of apertures aligned for registry with said apertures in said tray and sized to pass the sample containers therethrough, but to exclude said collar portions of said tags to facilitate simultaneous removal of said tags from said sample containers.

5. A device for holding a plurality of sample containers in an orderly arrangement, comprising, in combination:

a tray defining an array of indexed container holding stations, each of said stations adapted to receive and support one of same sample containers:

each of said container holding stations including means for supportion an indexable tag, said means for supporting also positioning an expansible portion of said tag to establish a substantially circumferential alignment with respect to the cross-section of a received sample container; and each of said stations further including a tag indexed to the station for automatically gripping said sample container as it is positioned in the station, said gripping of said tag to said sample container being operable to cause said tag to ordinarily remain with the sample container when it is removed from the station.

6. The device according to claim 5 wherein said container holding stations each comprise an aperture on said tray dimensioned to receive and support one of said sample containers.

7. The device according to claim 6 wherein said tags each include an indicia-bearing label portion, and a collar portion for gripping one of said sample containers.

* * * * *